Feb. 6, 1934.  E. A. ROCKWELL  1,946,112

POWER BRAKE CONSTRUCTION

Filed June 7, 1929  2 Sheets-Sheet 1

Inventor:
Edward A. Rockwell,
By Wilkinson, Huxley, Byron & Knight
Attys.

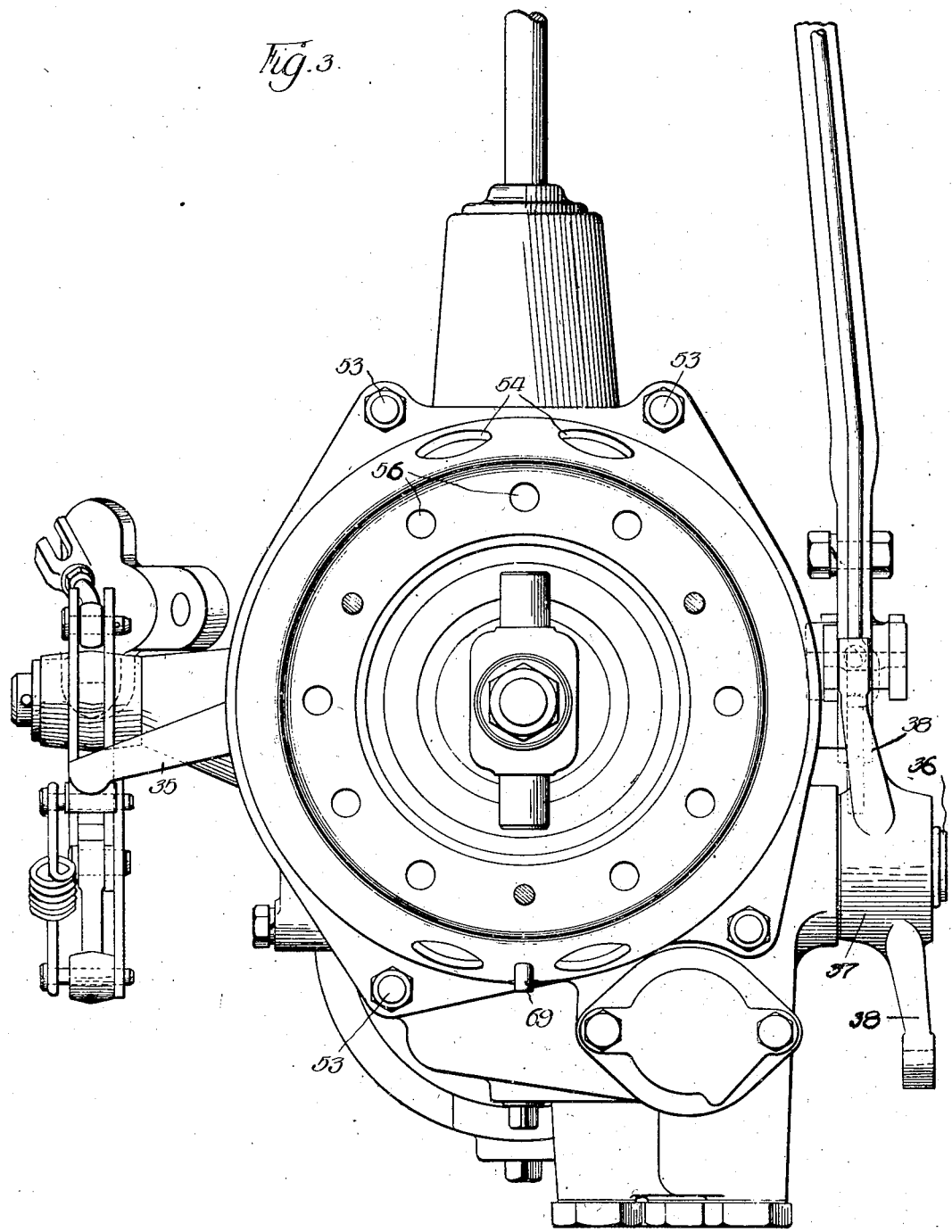

Patented Feb. 6, 1934

1,946,112

UNITED STATES PATENT OFFICE 1,946,112

POWER BRAKE CONSTRUCTION

Edward A. Rockwell, Chicago, Ill.

Application June 7, 1929. Serial No. 369,049

7 Claims. (Cl. 188—140)

This invention relates to improvements in the construction of power brake units and particularly to power brake units which are mounted on the propeller shaft of a vehicle between the transmission housing and the drive connection to the rear end.

In my previously filed application, Serial No. 224,846, filed October 8, 1927, I have disclosed a power brake unit which is adapted to be selectively controlled by an operator of the vehicle whereby the application of braking force to the wheel brakes is developed from the energy of rotation of the propeller shaft. Immediately adjacent the rear of the transmission housing is provided a casing enclosing the movable sleeves of the power brake unit and into which extends the bearing sleeve for the brake drum. The brake drum surrounds the open end of the casing. Adjacent the rear end of the power brake unit is provided the universal joint for connecting the transmission shaft to the Cardan shaft which extends to the differential housing.

It is an object of the present improvements to provide a construction of a power brake associated with a power shaft whereby the brake is completely enclosed in a housing which may have ventilating openings, if so desired, for air cooling.

It is a further object to so form the brake housing that it provides a bearing support for a relatively movable torque tube, and the cooperation between the brake housing and the torque tube forms a housing for a universal joint connection.

It is further an object of the present improvements to provide improved oil sealing means whereby the oil is prevented from leaking onto the internal friction surface of the brake drum.

Additional and further objects of the present invention will be more readily apparent from the following description taken in connection with the attached drawings in which—

Figure 3 is a vertical section taken through the universal joint connection and illustrating the rear portion of the power brake unit.

Figure 1:
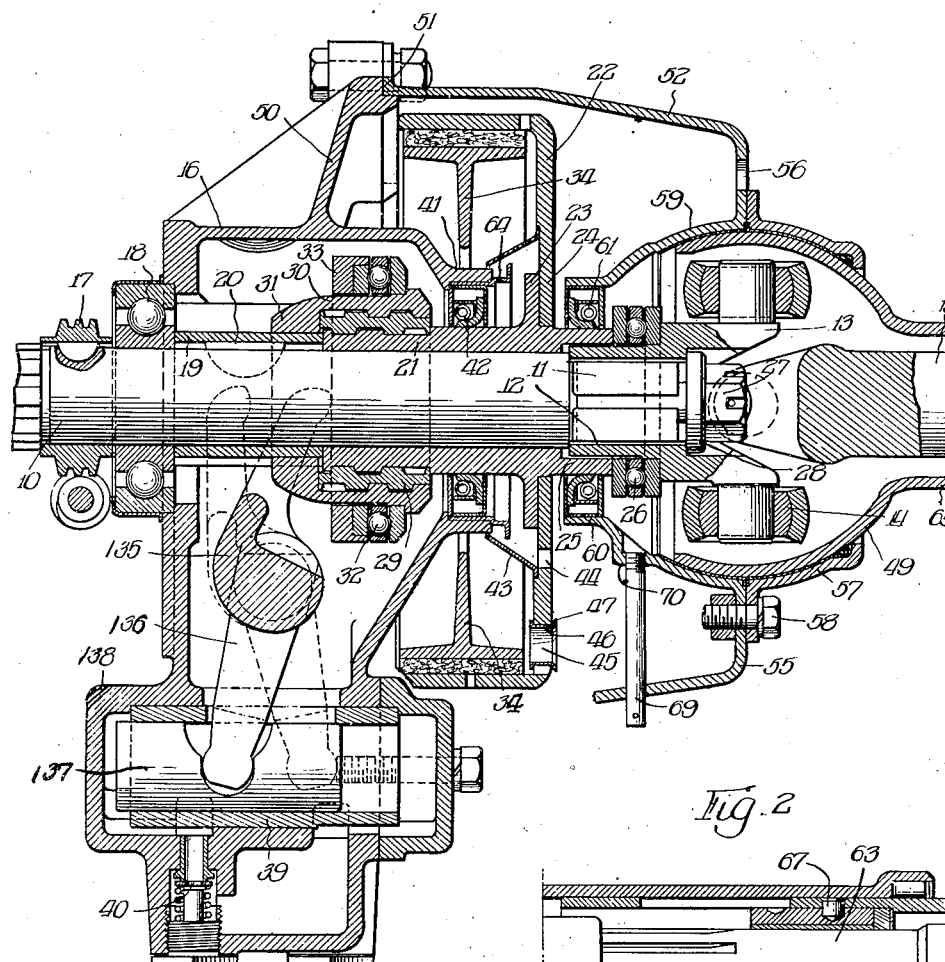
Figure 1 is a mutilated longitudinal section showing the internal construction of the power brake unit and the torque tube connection.

As illustrated in Figure 1, 10 is the transmission shaft extending from the transmission housing and having at its rearward end a reduced splined connection 11 to receive a sleeve 12 of the yoke 13. The yoke 13 is connected by a universal joint connection 14 to the yoke 15 having a socket to receive the splined end of the Cardan shaft 63 which extends to the differential housing. Surrounding the transmission shaft is mounted a power brake casing 16 which is immediately adjacent the transmission housing (not shown). The speedometer connection 17 is illustrated at the left-hand end of power shaft 10 adjacent which is a bearing 18. In abutting relation with the rear side of the bearing 18 is a spacing sleeve 19 which is keyed to the power shaft 10, as shown by the key 20.

Freely mounted on the power shaft 10 is a bearing sleeve 21 which serves as a mounting for the brake drum 22. The sleeve 21 has an integral flange 23 which may be secured to the flange 24 of the brake drum 22. At the rear end of the sleeve 21 is an integral enlarged sleeve 25 overlapping the sleeve 12 of the yoke. Mounted on the sleeve 12 of the yoke is a thrust bearing 26 in abutting relation with the rear end of the sleeve 21. The yoke sleeve 12 is held in place by the securing nut 27 which bears against the washer 28. It will be noted that the tightening of the nut 27 will only serve to move the yoke sleeve 12 to the left until it comes into engagement with the end of the reduced line portion 11 of the shaft, and therefore, the bearing sleeve for the brake drum will be substantially free for rotation.

The construction of the operating parts for the power operating unit are quite similar to that described in my previously mentioned co-pending application in that there is provided a double worm sleeve 29 which has oppositely threaded internal and external portions, the outer sleeve 30 is threaded to the external surface of the double worm sleeve 29 and is keyed to the external surface of the spacing sleeve 19 by the flange portion 31. Upon the external surface of the sleeve 30 is mounted a thrust bearing 32 having engagement therewith the thrust ring 33.

Internally expanding brake shoes 34 are mounted within the brake drum 22. Suitable linkage may be provided so that the operator may transmit a movement to the input arm 35 of the power brake unit which will serve to expand the brake shoes and develop retardation of the brake drum. This retardation will transmit a portion of braking directly to the power shaft but the major object of the retardation of the brake drum is to effectuate a lateral movement of the thrust ring 33 carried by the lateral movement of the sleeve 30. The lateral movement of the thrust ring 33 to the left, as shown in Figure 1, transmits a thrust to the upwardly extending arms of the yoke lever 135. The yoke lever 135 includes a pivot shaft 36 which extends outside of the casing 16 and has mounted thereon the brake lever 37 having oppositely extending arms 38 to which are attached the front and rear brake rods. Thus the wheel brakes are directly applied by the actuation of the power brake device due to the slight retardation force which is applied to the brake drum 22. The yoke lever 135 also includes a downwardly extending arm 136 which engages a plunger 137 of a dash pot. In Figure 1, the lower portion of the casing 16 forms a dash pot housing 138 within which is mounted a cylinder sleeve 39. The valve 40 is one of the valves for controlling the flow of the oil between the opposite ends of the dash pot. The dash pot serves to cushion the movement of the lever 35 and assists in producing a smooth and even application and release of the brakes.

Since the casing 16 is a lubricant housing, means must be provided to prevent the escape of the oil. Thus I show a ring-shaped portion 41 of the casing 16 which extends to enclose the sleeve 21 which carries the brake drum. Within the ring-shaped portion 41 is mounted suitable oil sealing means 42. A metal stamping member 64 is also held by the oil seal against the inner surface of the circular portion 41 of the housing.

An outwardly extending flange of the stamping member prevents the oil from leaking along the surface and back along the outer portion of the housing. The oil which leaks past the oil seal will instead drop from the edge of the stamping member and be deflected by the deflector 43 secured to the flange 24 of the brake drum. Leakage onto the internal braking surface of the drum is thus prevented.

The brake drum has formed in the flange thereof, openings 44 which permit the escape of the oil which is outwardly directed by the deflector 43. Ventilating openings 45 are also provided in the flange of the brake drum adjacent the internal braking surface. In order to prevent the oil which may leak through the openings 44 from passing along the flange 24 and leaking back into the interior of the brake drum through the opening 45, I have shown mounted in the openings 45 ferrules 46 having conical baffling ends 47.

Figure 2:
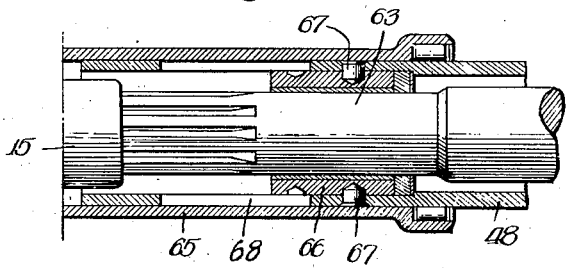
Figure 2 is a continuation from the right hand end of Figure 1.

Enclosing the Cardan shaft 15 is a customary torque tube 48 which has a spherical enlarged end 49. An improved feature of the present invention relates to an improved connection between the torque tube and the power brake unit. Thus I show an outwardly flanged portion 50 of the casing 16 which forms a bearing seat 51 for a ventilating housing 52 which substantially encloses the rotating brake drum. As shown in Figure 2, the housing 52 is secured to the casing 16 by the bolts 53 and is provided with relatively large sized ventilating openings 54. The housing 52 rearwardly extends to a vertical ring-shaped portion 55 having a plurality of ventilating openings 56 and also having secured thereto a cap 57 by the bolts 58. The cap 57 encloses a portion of the spherically enlarged end 49 of the torque tube.

From the ring-shaped portion 55 the housing 52 is inwardly turned to form a hemispherical bearing portion 59 which serves to support the end 49 of the torque tube. The vertical plane between the cap 57 and the housing 52 extends directly through the center of the universal joint connection, as will be clearly apparent from Figure 1. The hemispherical portion 59 of the housing 52 extends to a ring-shaped flange 60 enclosing oil sealing means 61 which bears against the end 25 of the sleeve 21. Thus leakage of the lubricant from the torque tube is prevented by the oil seal 61.

The main sleeve 48 of the torque tube slides relative to the sleeve 65 which extends from the ball end 49. A bearing 66 for the shaft 63 is held to the end of the sleeve 48 by pins 67. Slots 68 are formed in the tube 48 for lubrication of the outer sleeve 65.

As a means for admitting lubricant to the universal joint housing and particularly to the thrust bearing within the housing, there is shown a lubricant pipe 69 extending through the casing 55 and threaded into a boss 70 of the bearing portion 59. A standard fitting is provided on the outer end of the pipe to receive a pressure feed lubricating device. The lubricant pipe may be placed in a position found most convenient to reach and therefore may come in from the side instead of the bottom as shown.

The construction which has been described has been found especially suitable where it is desired to install a power brake unit in a vehicle having a standard torque tube. The ventilating housing serves as one-half of the ball and socket joint of the torque tube connection and it is further possible to mount the thrust bearing within the universal joint housing which eliminates the necessity of constructing the power brake unit with a separate thrust bearing. The oil sealing means are reduced to a minimum and leakage of the oil onto the friction surface of the brake drum is prevented.

Although I have described a preferred embodiment of the present improvements it will be apparent that many changes and modifications may be resorted to without departing from the spirit of the invention as expressed in the appended claims.

I claim:

1. In combination, a power shaft, a Cardan shaft, a universal joint connecting said shafts including a yoke keyed to one end of said power shaft, a thrust bearing mounted on said yoke and a brake drum mounted on said power shaft including a sleeve in abutting relation with said thrust bearing, a casing enclosing said brake drum said casing including a hemispherical portion, a torque tube having a spherical end in bearing relation with said hemispherical portion of said casing and oil sealing means surrounding the sleeve of said brake drum between said brake drum and said torque tube bearing, said oil sealing means being held by a ring-shaped portion extending from said hemispherical portion of said casing.

2. In combination, a power shaft, a brake drum mounted on said power shaft, a conical oil deflecting flange secured to the flange of said brake drum, the flange of said brake drum having openings therein permitting the escape of oil from said conical deflector, said brake drum having an internal braking surface, ventilating openings formed adjacent said braking surface and ferrules secured in said ventilating openings, said ferrules having conical baffling ends to prevent the leakage of oil through said ventilating openings.

3. In a device of the character described, a drive shaft, a driven shaft, a universal joint connection between said shafts, a normally rotatable but retardable brake element mounted concentric with respect to said drive shaft, spirally coupled sleeve members, at least one of which is keyed for rotation with said drive shaft and another of which is fixed to rotate with said brake element, a housing enclosing said brake element and said spirally coupled sleeve, said housing including an inwardly formed hemispherical bearing portion, a torque tube having a semi-spherical end in bearing relation with said hemispherical portion of said housing and enclosing said universal joint connection, oil sealing means separating the housing for said brake element from the housing for said universal joint connection.

4. In a device of the character described, a drive shaft, a driven shaft, a universal joint connection between said shafts including a yoke keyed to said drive shaft, a normally rotatable but retardable brake element mounted concentric with respect to said drive shaft, spirally coupled sleeve members, one of which is keyed to rotate with said drive shaft and another of which is fixed for rotation with said brake element, a thrust bearing mounted on said yoke, one of said sleeve members being in abutting relation with said thrust bearing, a housing enclosing said brake element and spirally coupled sleeve members, said housing including a cup-shaped portion partially enclosing the universal joint connection, a torque tube enclosing said driven shaft including a ball-shaped end mounted in the cup-shaped portion of said housing and oil sealing means mounted in said housing between said brake element and said universal joint connection.

5. In combination, a power unit adapted for controlling the speed of an automobile, a housing enclosing the same, a friction device, adapted to control the power unit, a housing for the friction device and oil sealing means separating the said housings.

6. In combination, a power unit adapted for controlling the speed of an automobile, a housing enclosing the same, a friction device adapted to control the power unit, a housing for the friction device, a universal joint, a housing therefor and oil sealing means separating the said three housings.

7. In combination, a power unit adapted for controlling the speed of an automobile, a friction device adapted to control the power unit, a housing for the friction device, a universal joint, a housing therefor an oil sealing means separating the said housings.

EDWARD A. ROCKWELL.